(12) United States Patent
Itzenberger et al.

(10) Patent No.: US 10,464,161 B2
(45) Date of Patent: Nov. 5, 2019

(54) POWER SUPPLY UNIT FOR A RESISTANCE WELDING APPARATUS

(71) Applicant: Fronius International GmbH, Pettenbach (AT)

(72) Inventors: Daniel Itzenberger, Thalheim bei Wels (AT); Martin Hoertenhuber, Eberstalzell (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 526 days.

(21) Appl. No.: 15/275,843

(22) Filed: Sep. 26, 2016

(65) Prior Publication Data

US 2018/0085845 A1    Mar. 29, 2018

(51) Int. Cl.
*B23K 11/24* (2006.01)
*B23K 11/25* (2006.01)
*B25J 15/00* (2006.01)

(52) U.S. Cl.
CPC .......... *B23K 11/241* (2013.01); *B23K 11/245* (2013.01); *B23K 11/25* (2013.01); *B23K 11/251* (2013.01); *B23K 11/255* (2013.01); *B23K 11/257* (2013.01); *B25J 15/0019* (2013.01); *G05B 2219/45135* (2013.01); *Y10S 901/42* (2013.01)

(58) Field of Classification Search
CPC ... B23K 11/241; B23K 11/255; B23K 11/257; B23K 11/25; B23K 11/251; B23K 11/245; Y10S 901/42
See application file for complete search history.

(56) References Cited

U.S. PATENT DOCUMENTS

| | | | |
|---|---|---|---|
| 2013/0334178 A1* | 12/2013 | Scholz | B23K 11/24 219/108 |
| 2014/0313679 A1* | 10/2014 | Artelsmair | B23K 11/241 361/748 |
| 2014/0374389 A1* | 12/2014 | Arai | B23K 11/26 219/113 |

* cited by examiner

*Primary Examiner* — Geoffrey S Evans
(74) *Attorney, Agent, or Firm* — Westman, Champlin & Koehler, P.A.

(57) ABSTRACT

A power supply unit for a resistance welding apparatus, said power supply unit comprising a converter circuit adapted to convert an alternating power supply current, AC, applied via a residual current protection circuit to an input of said converter circuit into a pulsed electrical current supplied from an output of said converter circuit to a primary coil of a transformer of said resistance welding apparatus, and at least one switching element provided between the output of said converter circuit and protective earth.

24 Claims, 5 Drawing Sheets

POWER SUPPLY UNIT FOR A RESISTANCE WELDING APPARATUS

TECHNICAL FIELD

The invention relates to a power supply unit for a resistance welding apparatus and to a method for performing resistance welding using such a resistance welding apparatus.

TECHNICAL BACKGROUND

Resistance welding is a thermo-electric process in which heat is generated at the interface of two parts to be joined by passing an electrical current through the parts for a precisely controlled time and under a controlled pressure. The power for the resistance welding process is provided by a power supply unit. The resistance welding power supply unit can transform, modulate and control the electrical energy received from a power supply network and applies it to the resistance welding equipment according to a weld schedule. The resistance welding equipment can comprise a weld head comprising welding electrodes. The welding electrodes are installed in the weld head to touch and maintain contact with the workpieces according to the weld schedule. The weld head including the welding electrodes functions to force the workpieces together and to hold them during the welding process. The amplitude and duration of forces and heating parameters are defined by the weld schedule. The weld schedule can comprise different parameters including an electrode force, a squeeze time, and a hold time.

Welding transformers are used in the power supply unit to change an alternating current from the power supply network into a low voltage, high amperage current in the secondary winding. Inverter-based power sources have replaced traditional thyristor-controlled power sources. A switch mode converter-based power source or power supply unit comprises an inverter bridge circuit. The inverter bridge circuit can be controlled using a pulse width PWM scheme to regulate the output voltage and current supplied to the primary coil of the transformer.

A conventional resistance welding apparatus can comprise a switch between the output of the converter bridge circuit and the primary coil of the welding transformer to increase security for an operator using the resistance welding equipment. The security switching element in a conventional power supply unit is provided in the current supply path between the converter circuit comprising the inverter bridge and the primary coil of the transformer. The protective switching element between the output of the converter circuit and the input of the transformer is only closed during the welding process. Consequently, only during the welding process, voltages are applied at the transformer supply lines when the protective switching element is switched on. If no resistance welding is performed the protective switching element switched in series between the converter circuit and the transformer is automatically switched off by a controller of the conventional power supply unit. The protective switching element is formed by an electromechanical switching element comprising a contactor or a relay controlled by a controller of the resistance welding apparatus. The stray or leakage inductivity introduced by the electromechanical protective switching element connected in series between the output of the converter circuit and the transformer causes additional power losses because of skin effects. With increasing switching frequency, the skin effect increases the power losses. With switching frequencies above 1 kHz the leakage inductivity caused by the protective switching element leads to unacceptable reduction of the performance capability of the power supply.

Accordingly, there is a need for a power supply unit providing security for an operator of a resistance welding apparatus providing a minimum power loss when using high switching frequencies.

SUMMARY OF THE INVENTION

The invention provides according to a first aspect a power supply unit for a resistance welding apparatus, said power supply unit comprising:

a converter circuit adapted to convert an alternating power supply current applied via a residual current protection circuit to an input of said converter circuit into a pulsed electrical current supplied from an output of said converter circuit to a primary coil of a transformer of said resistance welding apparatus and at least one switching element provided between the output of said converter circuit and protective earth.

In a possible embodiment of the power supply unit according to the first aspect of the present invention, the power supply unit comprises a controller adapted to control said switching element.

In a further possible embodiment of the power supply unit according to the first aspect of the present invention, the power supply unit comprises an interface for connecting an external controller of said resistance welding apparatus with the power supply unit.

In a further possible embodiment of the power supply unit according to the first aspect of the present invention, during welding intermissions of a resistance welding process performed by the resistance welding apparatus, the controller is adapted to switch automatically the at least one switching element on such that the output of the converter circuit of said power supply unit and both connection terminals of the primary coil of the transformer are switched to protective earth potential.

In a further possible embodiment of the power supply unit according to the first aspect of the present invention, a capacitor is connected in series with the switching element.

In a further possible embodiment of the power supply unit according to the first aspect of the present invention, a resistor is connected in series with the capacitor.

In a further possible alternative embodiment of the power supply unit according to the first aspect of the present invention, a resistor is connected in parallel with the capacitor.

In a still further possible embodiment of the power supply unit according to the first aspect of the present invention, the at least one switching element comprises an electromechanical switching element.

In a further possible alternative embodiment of the power supply unit according to the first aspect of the present invention, the at least one switching element comprises an integrated semiconductor switching element.

In a further possible embodiment of the power supply unit according to the first aspect of the present invention, the at least one switching element comprises a switching state monitoring sensor connected to a controller and being adapted to monitor a switching state of said switching element.

In a further possible embodiment of the power supply unit according to the first aspect of the present invention, the pulsed current applied from the output of the converter circuit to the primary coil of the transformer of said resistance welding apparatus during the welding process performed by the resistance welding apparatus comprises a frequency of more than 500 Hz.

In a further possible embodiment of the power supply unit according to the first aspect of the present invention, the transformer of the resistance welding apparatus comprises the primary coil connected to the output of the converter circuit of said power supply unit and a secondary coil connected to a current rectifier circuit adapted to rectify the transformed pulsed current output by the secondary coil of said transformer.

In a further possible embodiment of the power supply unit according to the first aspect of the present invention, a resistance welding equipment is connected to said current rectifier circuit to receive the rectified current output by the current rectifier circuit.

In a still further possible embodiment of the power supply unit according to the first aspect of the present invention, the resistance welding equipment of said resistance welding apparatus is operated in a security area of a resistance welding cell of said resistance welding apparatus, wherein at least one security sensor is connected to a controller adapted to monitor whether a person has entered the security area of the resistance welding cell.

In a further possible embodiment of the power supply unit according to the first aspect of the present invention, wherein if the at least one security sensor of said resistance welding apparatus notifies the controller of said power supply unit that a person has entered the security area of said resistance welding cell the controller switches automatically the switching element on such that the primary coil of the transformer is connected directly or via a capacitor to protective earth potential.

In a still further possible embodiment of the power supply unit according to the first aspect of the present invention, the residual current protection circuit of the power supply unit comprises a sensor coil adapted to measure a residual current flowing through wires connecting a single or multiphase power supply network with the input of said converter circuit and a monitoring logic adapted to trigger a circuit breaker provided between the power supply network and the converter circuit if the residual current measured by said sensor coil exceeds a predetermined threshold value.

In a still further possible embodiment of the power supply unit according to the first aspect of the present invention, the monitoring logic of said residual current protection circuit is connected to a controller and/or is integrated in the controller and/or is connected directly to the switching element.

In a still further possible embodiment of the power supply unit according to the first aspect of the present invention, the monitoring logic is adapted to switch the switching element such that the primary coil of the transformer is connected to the protective earth potential if the measured residual current exceeds the predetermined threshold value.

In a still further possible embodiment of the power supply unit according to the first aspect of the present invention, the electromechanical switching element of said power supply unit comprises a contactor controlled by a controller of the resistance welding apparatus.

In a still further possible embodiment of the power supply unit according to the first aspect of the present invention, the electromechanical switching element of said power supply unit comprises a relay controlled by a controller of said resistance welding apparatus.

The invention further provides according to a second aspect a resistance welding apparatus comprising
a power supply unit having a converter circuit adapted to convert an alternating power supply current applied via a residual current protection circuit to an input of said converter circuit into a pulsed current supplied from an output of said converter circuit to a primary coil of a transformer of said resistance welding apparatus and having at least one switching element provided between the output of said converter circuit and protective earth, said resistance welding apparatus further comprising a resistance welding equipment connected to a secondary coil of said transformer.

In a possible embodiment of the resistance welding apparatus according to the second aspect of the present invention, the resistance welding equipment is operated in a security area of a resistance welding cell having at least one security sensor connected to a controller of said resistance welding apparatus and adapted to monitor whether a person has entered the security area of said resistance welding cell.

In a further possible embodiment of the resistance welding apparatus according to the second aspect of the present invention, the controller of the resistance welding apparatus is adapted to switch automatically the switching element on such that the output of said converter circuit and the primary coil of the transformer of the resistance welding apparatus is connected to protective earth potential if the security sensor of the resistance welding cell notifies the controller that a person or any other object has entered the security area of the resistance welding cell.

In a still further possible embodiment of the resistance welding apparatus according to the second aspect of the present invention, the resistance welding equipment of the resistance welding apparatus comprises a welding gun with electrodes connected via wires extending through a moveable welding robot arm to the secondary coil of the transformer of said resistance welding apparatus.

The invention further provides according to a third aspect a method for performing resistance welding, wherein an alternating power supply current applied via a residual current protection circuit is converted into a pulsed current transformed by a transformer into an electrical current supplied to a resistance welding equipment, wherein during welding intermissions a primary coil of the transformer is automatically switched by a switching element to protective earth potential.

In a possible embodiment of the method according to the third aspect of the present invention, if a security area around the resistance welding equipment is entered by a person the primary coil of the transformer is automatically switched by the switching element to protective earth potential.

In a further possible embodiment of the method according to the third aspect of the present invention, if a measured residual current of the alternating power supply current ex-seeds a predetermined threshold value the primary coil of the transformer is automatically switched by the switching element to protective earth potential and the alternating power supply current is interrupted by the residual current protection circuit.

In a still further possible embodiment of the method according to the third aspect of the present invention, a switching state of said switching element is continuously monitored.

In a still further possible embodiment of the method according to the third aspect of the present invention, if the monitored switching state of the switching element does not comply with a switching command previously applied to said switching element a warning signal is generated and/or the resistance welding is automatically interrupted.

In a further possible embodiment of the method according to the third aspect of the present invention, the primary coil of the transformer is switched by said switching element via a capacitor to protective earth potential.

BRIEF DESCRIPTION OF FIGURES

In the following, possible exemplary embodiments of the different aspects of the present invention are described with reference to the enclosed figures.

DETAILED DESCRIPTION OF EMBODIMENTS

Figure 1:
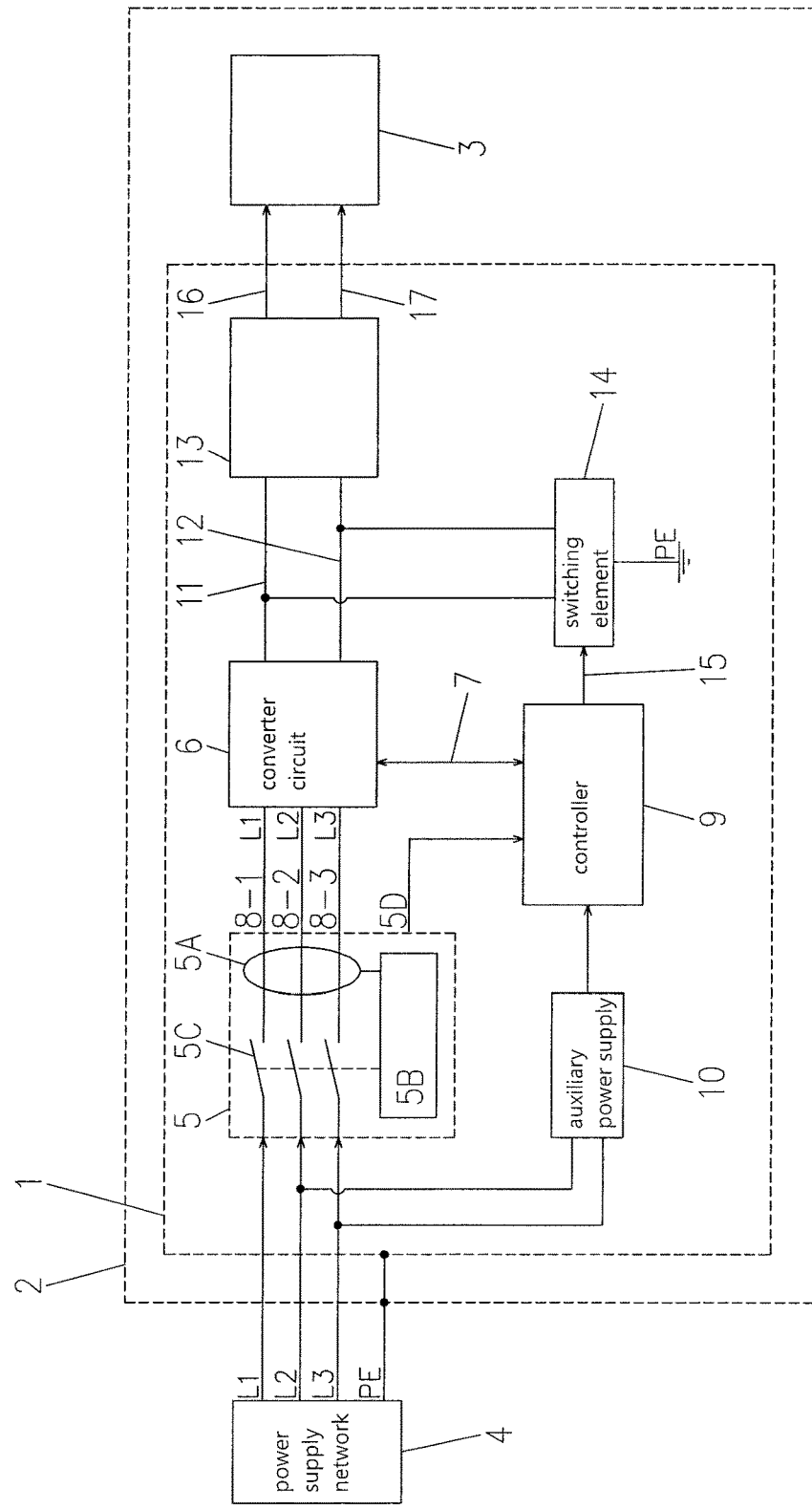
FIG. 1 shows a block diagram of a possible exemplary embodiment of a power supply unit according to the first aspect of the present invention.

FIG. 1 shows a block diagram of an exemplary embodiment of a power supply unit 1 according to the first aspect of the present invention. The power supply unit 1 can be used for a resistance welding apparatus 2. The resistance welding apparatus 2 comprises in the illustrated embodiment the power supply unit 1 which provides a power supply to a resistance welding equipment 3. The power supply unit 1 of the resistance welding apparatus 2 can be connected to a power supply network 4 as illustrated in FIG. 1. The power supply network 4 can be a power supply grid providing three alternating current phases L1, L2, L3 and protective earth PE as shown in FIG. 1. The power supply network 4 can also be a local power supply network having at least one alternating current phase L.

As illustrated in FIG. 1, the power supply unit 1 comprises in the shown embodiment a residual current protection circuit 5, which is connected to the power supply network 4 via electrical conductive wires carrying the alternating current power supply phases L1, L2, L3. On the upper side, the residual current protection circuit 5 is connected via electrical wires 8-1, 8-2, 8-3 to a converter circuit 6 of the power supply unit 1. A sensor coil 5A is adapted to measure a residual current flowing through the wires 8-1, 8-2, 8-3 used for the alternating current phases L1, L2, L3. The sensor coil 5A is connected to a monitoring logic 5B of the residual current protection circuit 5. The monitoring logic 5B can be adapted to trigger a circuit breaker 5C of the residual current protection circuit 5 if the residual current measured by the sensor coil 5A exceeds a predetermined threshold value.

The sensor coil 5A can be formed by a differential current transformer which surrounds the live and neutral conductor wires. In a possible embodiment, the residual current protection circuit 5 and the converter circuit 6 are further connected by a neutral conductor (not illustrated in FIG. 1). In normal operation, all currents down the live conductors L re-turn up the neutral conductor N. Electrical currents through the conductors are opposite to each other and cancel each other out. If any fault to earth potential occurs an imbalance in the currents I flowing through and the different conductors is caused, i.e. a non-zero sum of currents from among various conductors, for example the three-phase conductors L1, L2, L3 and one neutral conductor N, can be sensed by the sensor coil 5A and notified to a monitoring logic 5B. This triggers one or several circuit breakers 5C within the residual current protection circuit 5 such that the input of the converter circuit 6 is separated from the power supply network 4. Accordingly, if the residual current measured by the sensor coil 5A exceeds a predetermined configurable threshold value the residual current protection circuit 5 separates the converter circuit 6 automatically from the power supply network 4.

The converter circuit 6 of the power supply unit 1 is adapted to convert at least one alternating power supply current applied via the residual current protection circuit 5 to an input of the converter circuit 6 into a pulsed electrical current applied from an output of said converter circuit 6 via wires 11, 12 to a primary coil 13A of a transformer 13 of said power supply unit 1. As shown in FIG. 1 the converter circuit 6 is controlled by a controller 9, which is also part of the power supply unit 1. This is done by means of the control line 7. The controller 9 is powered by the auxiliary power supply 10. The controller 9 of the power supply unit 1 is connected via a control line 5D to the residual current protection circuit 5. The power supply unit 1 further comprises at least one switching element 14 provided between the output of the converter circuit 6 and protective earth PE as illustrated in FIG. 1. In the illustrated embodiment of FIG. 1, the switching element 14 is also controlled by the controller 9 of the power supply unit 1 via a control line 15. In a possible embodiment, the power supply unit 1 can also comprise an interface for connecting an external controller of the resistance welding apparatus 2 or of a local control network directly with the switching element 14 or to the local controller 9 of the power supply unit 1. The welding transformer 13 of the power supply unit 1 is used to change an alternating current from the power lines into a low volt-age, high amperage current in its secondary winding 13B. A combination of primary and/or secondary taps on the welding transformer 13 can be used in a possible implementation to provide a macro-adjustment of the welding current as well as an adjustment of a secondary voltage. The secondary coil or secondary winding 13B of the transformer 13 is connected via power supply lines 16, 17 to the resistance welding equipment 3.

During welding intermissions of a resistance welding process performed by the resistance welding apparatus 2, the controller 9 is adapted to switch automatically the at least one switching element 14 on such that the output of the converter circuit 6 of the power supply unit 1 and both connection terminals of the primary coil 13A of the transformer 13 are switched to a protective earth potential PE.

The switching element 14 is formed in a possible embodiment by at least one electromechanical switching element. In an alternative embodiment, the switching element 14 can also comprise an integrated semiconductor switching element. The pulsed current applied from the output of the converter circuit 6 via the wires 11, 12 to the primary coil 13A of the transformer 13 during the welding process performed by the resistance welding apparatus 2 comprises in a possible embodiment a frequency of more than 500 Hz. The electromechanical switching element 14 of the power supply unit 1 can comprise in a possible embodiment a contactor. In an alternative embodiment, the electromechanical switching element 14 of the power supply unit 1 comprises a relay controlled by the controller 9 of the resistance welding apparatus 2. The resistance welding equipment 3 as shown in FIG. 1 can be operated in a security area of a resistance welding cell. In a possible embodiment, the resistance welding equipment 3 of the resistance welding apparatus 2 comprises a welding gun with electrodes connected via wires extending through a movable welding robot arm to the secondary coil 13B of the transformer 13.

The resistance welding equipment 3 can comprise at least one welding head. During the resistance welding process, it is necessary to control the applied force to the workpieces. The mechanical system to apply the force is referred to as the welding head. The welding head including the welding electrodes is adapted to force the workpieces together and to hold them during the welding process. The welding head pro-vides the current path and provides the welding pressure or force. The weld head can trigger or initiate the weld current flowing through the workpieces. The weld head may also pro-vide a follow-up force as the workpieces melt together.

Further, the weld head can cool in a possible embodiment the workpieces after the welding process has been accomplished. A first schedule can ensure that proper electrical contact resistance and a proper heat balance are both achieved and maintained between the workpieces and the electrodes of the weld head. The welding electrodes can be installed in the weld head to touch and maintain a contact with the workpieces during the welding process according to a welding schedule. The welding schedule comprises configurable parameters including the electrode force, a squeeze time, a weld pulse and hold time. The welding sequence or heat profile can comprise a series of current pulses applied to the workpieces by the electrodes. In a possible embodiment, the shape of the pulses of the welding sequence can be preconfigured or adjusted during operation of the welding apparatus 2 according to an operation mode of the resistance welding apparatus 2. The shape of the pulses' slope and the positive and/or negative amplitudes of the pulses can vary depending on the material of the welded workpieces.

The resistance welding process including the resistance welding equipment 3 requires normally a short process time. No consumables such as brazing material, solder or welding rods are required. Because of the low voltage provided by the welding transformer 13 on the secondary coil, the operator performing the welding process is comparatively safe as long as there are no fault conditions. During welding intermissions of the resistance welding process, the controller 9 switches automatically the at least one switching element 14 on such that the output of the converter circuit 6 and both connections of the primary coil 13A of the transformer 13 are switched to protective earth potential PE. During a welding phase, the contacts of the switching element 14 are open.

When the welding has been accomplished the switching element 14 is closed to guarantee that no high voltages which are potentially dangerous to a person are supplied to the welding cell of the resistance welding apparatus 2. Further, the residual current protection circuit 5 can comprise in a possible embodiment a low trigger current triggering the circuit breaker. The trigger current can be in a possible embodiment about 15 to 30 mA. In case that a fault occurs and a current flows to protective earth PE or in case the converter circuit 6 is defect or in case of any other capacitive coupling, the residual current protection circuit 5 separates the converter circuit 6 from the power supply network 4 completely.

The power supply unit 1 as illustrated in FIG. 1 allows to use a high switching frequency since the switching element 14 is provided between the output of the converter circuit 6 and protective earth PE and not within the current supply path from the converter circuit 6 to the resistance welding equipment 3. The switching element 14 of the power supply unit 1 as illustrated in FIG. 1 can be significantly smaller than conventional switching elements being serially connected between the converter circuit 6 and the transformer 13 because the switching element 14 of the power supply unit 1 according to the first aspect of the present invention has only to carry a maximum current of 15 to 30 mA. An electrical current of 15 to 30 mA is a current which typically triggers the residual current protection circuit 5 of the power supply unit 1. During the normal welding process, the contacts of the switching element 14 are open so that no current flows via the contacts of the switching element 14. Consequently, the operation lifetime of the switching element 14 used by the power supply unit 1 is high. The switching element 14 is during normal operation not in the current supply path and has consequently no impact on the stray or leakage inductivity. The pulsed current applied from the output of the converter circuit 6 to the primary coil of the transformer 13 during the normal welding operation can comprise in a possible embodiment a frequency of at least 500 Hz. In a preferred embodiment, the frequency of the pulsed current applied to the primary coil 13A of the transformer 13 is in a range between 500 and 1.2 kHz. In a further possible embodiment, the frequency of the applied pulsed current can be even higher, i.e. up to 25 kHz. The provision of the switching element 14 between the output of the converter circuit 6 and protective earth PE minimizes the leakage or stray inductivity between the output of the converter circuit 6 and the input of the transformer 13. This allows to apply a pulsed current signal with a higher frequency without significant power losses. Further, the switching element 14 can be implemented by a switching element of small size. Consequently, the circuitry of the power supply unit 1 can be integrated into a smaller housing.

Figure 2:
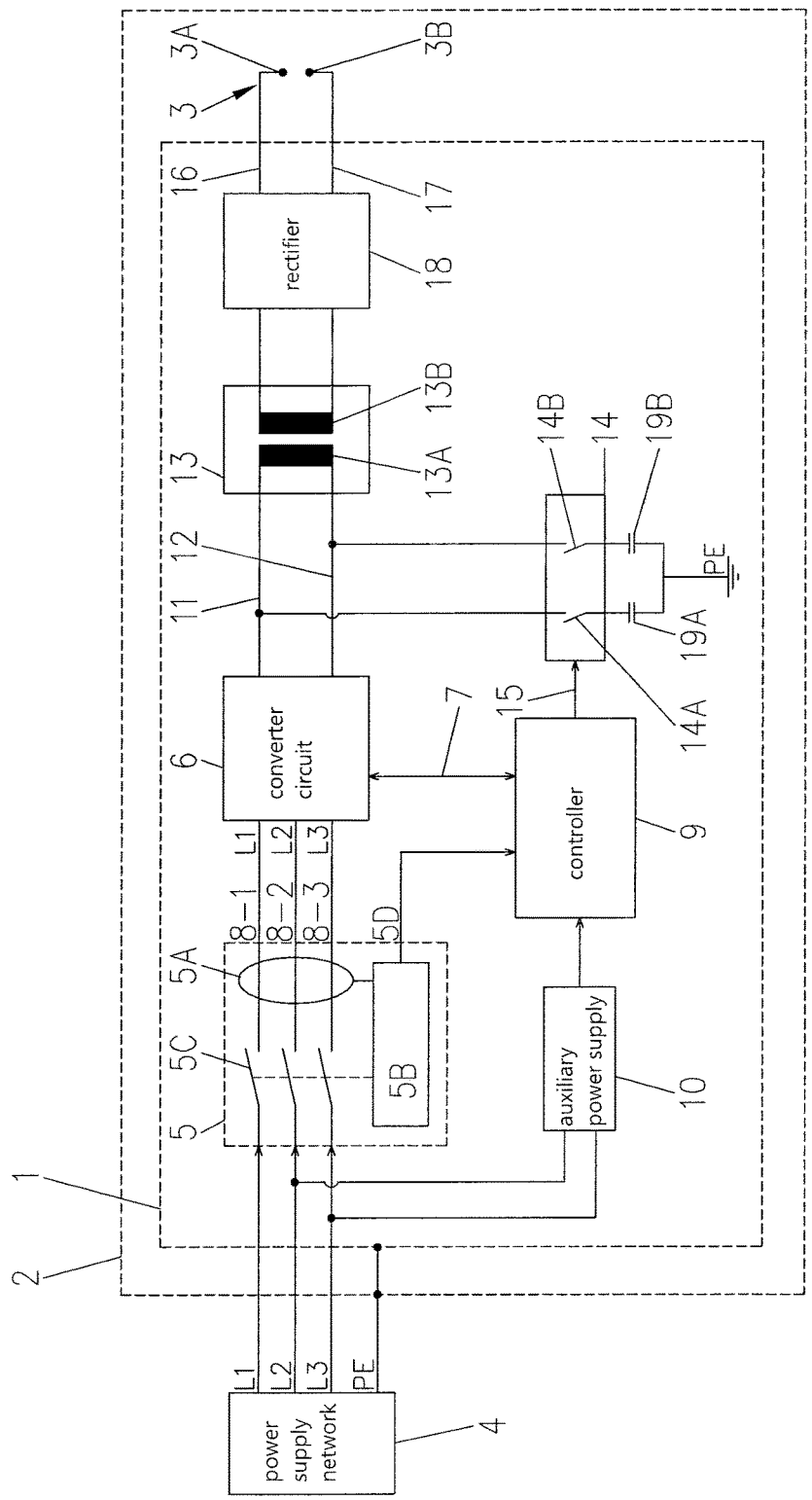
FIG. 2 shows a block diagram of a further possible exemplary embodiment of a power supply unit according to the present invention.

FIG. 2 shows a block diagram of a possible exemplary embodiment of a power supply unit 1 according to the first aspect of the present invention. As can be seen in FIG. 2, the output of the converter circuit 6 is connected via wires 11, 12 to a primary coil 13A of the transformer 13. The transformer 13 further comprises a secondary coil 13B connected via a current rectifier circuit 18 to the resistance welding equipment 3. The rectifier circuit 18 can comprise active and or passive semiconductor elements. The resistance welding equipment 3 comprises two electrodes 3A, 3B as shown in FIG. 2. The secondary coil 13B of the transformer 13 is connected to the current rectifier circuit 18 which is adapted to rectify the transformed pulsed current output by the secondary coil 13B of the transformer 13 and to supply the rectified current to the resistance welding equipment 3.

The switching element 14 comprises in the illustrated exemplary embodiment two switching contact elements 14A, 14B which are connected to the wires 11, 12 connecting the output of the converter circuit 6 to the two input terminals of the primary coil 13A of the welding transformer 13. The controller 9 of the power supply unit 1 is adapted to switch automatically the switching contact elements 14A, 14B of the switching element 14 on such that the output of the converter circuit 6 and both connection terminals of the primary coil 13A of the transformer 13 are switched to the protective earth potential PE. In the embodiment illustrated in FIG. 2, a capacitor 19A, 19B is connected in series to the respective contact switching element 14A, 14B. In case of a fault condition such as a defect IGBT of the converter circuit 6 a current flows via the capacitor to trigger the residual current protection circuit 5 of the power supply unit 1. The current via the capacitor flows for a comparatively short time but which is sufficient to trigger the residual current protection circuit 5. The residual current protection circuit 5 triggered by the current separates the input of the converter circuit 6 from the power supply network 4 protecting the operator.

In a possible embodiment, a resistor can be connected in series and/or in parallel with the capacitors 19A, 19B shown in FIG. 2. In the illustrated embodiment of FIG. 2, the capacitors 19A, 19B are provided between the switching contact elements 14A, 14B and the protective earth PE. In an alternative embodiment, the capacitors 19A, 19B can also be provided between the switching contact elements 14A, 14B and the output of the converter circuit 6.

In a possible embodiment, a resistor is connected in parallel to each of the capacitor elements 19A, 19B. These resistors connected in parallel can comprise a resistance of more than 100 kOhm. If a serial connected resistor is used it can comprise a resistance of less than 1 kOhm. In a possible implementation, each capacitor 19A, 19B comprises a capacitance of at least 400 nF. An advantage of using capacitor elements 19A, 19B as illustrated in FIG. 2 is that a current flowing via the switching contact elements 14A, 14B of the switching element 14 is limited. This allows to reduce further the size of the switching element 14.

Figure 3:
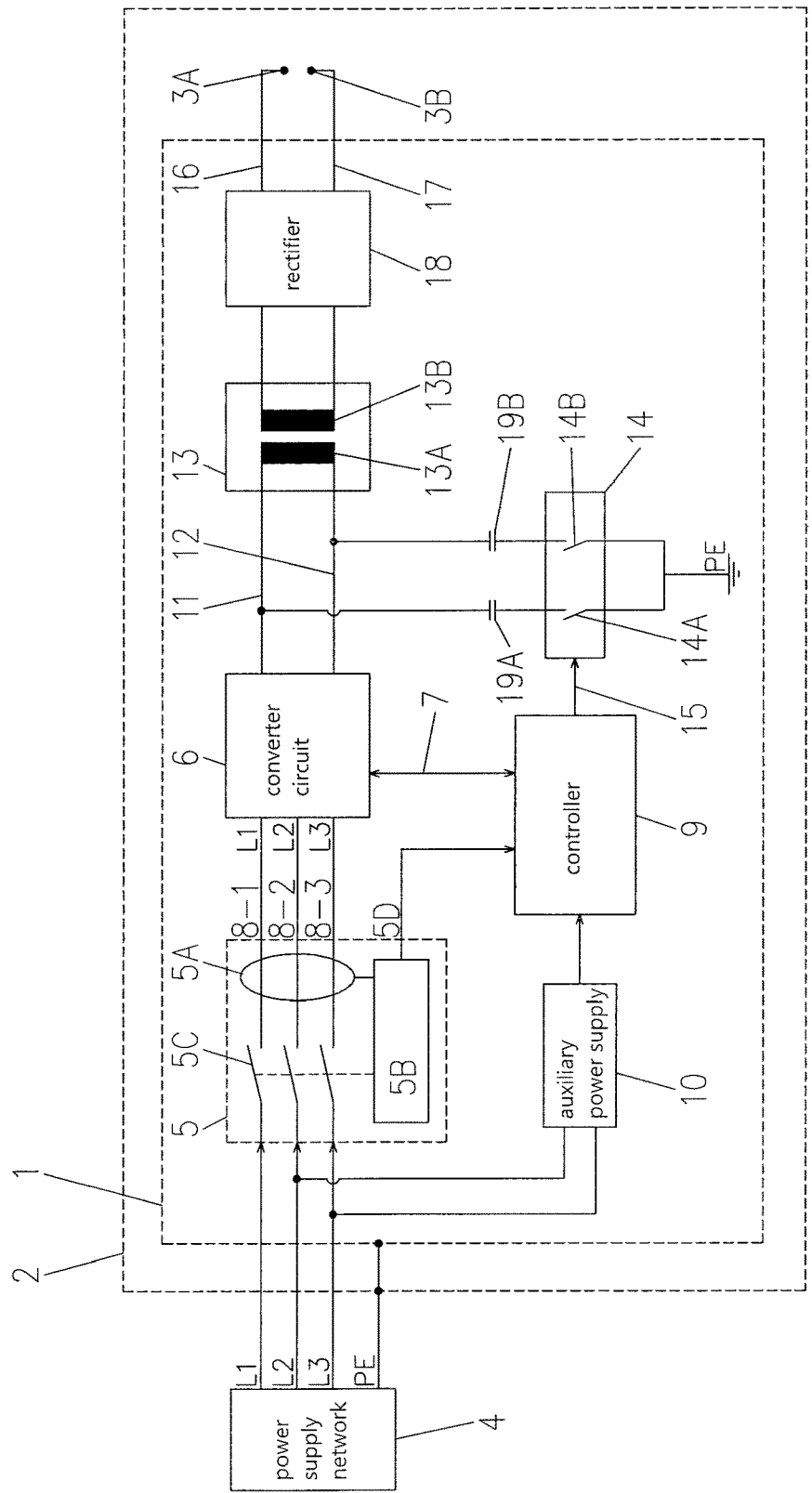
FIG. 3 shows a block diagram of a further possible exemplary embodiment of a power supply unit according to the present invention.

FIG. 3 shows a possible embodiment where the capacitor elements 19A, 19B are provided between the output of the converter circuit 6 and the switching element 14. In a possible implementation, the capacitors 19A, 19B can be integrated in the switching element 14.

Figure 4:
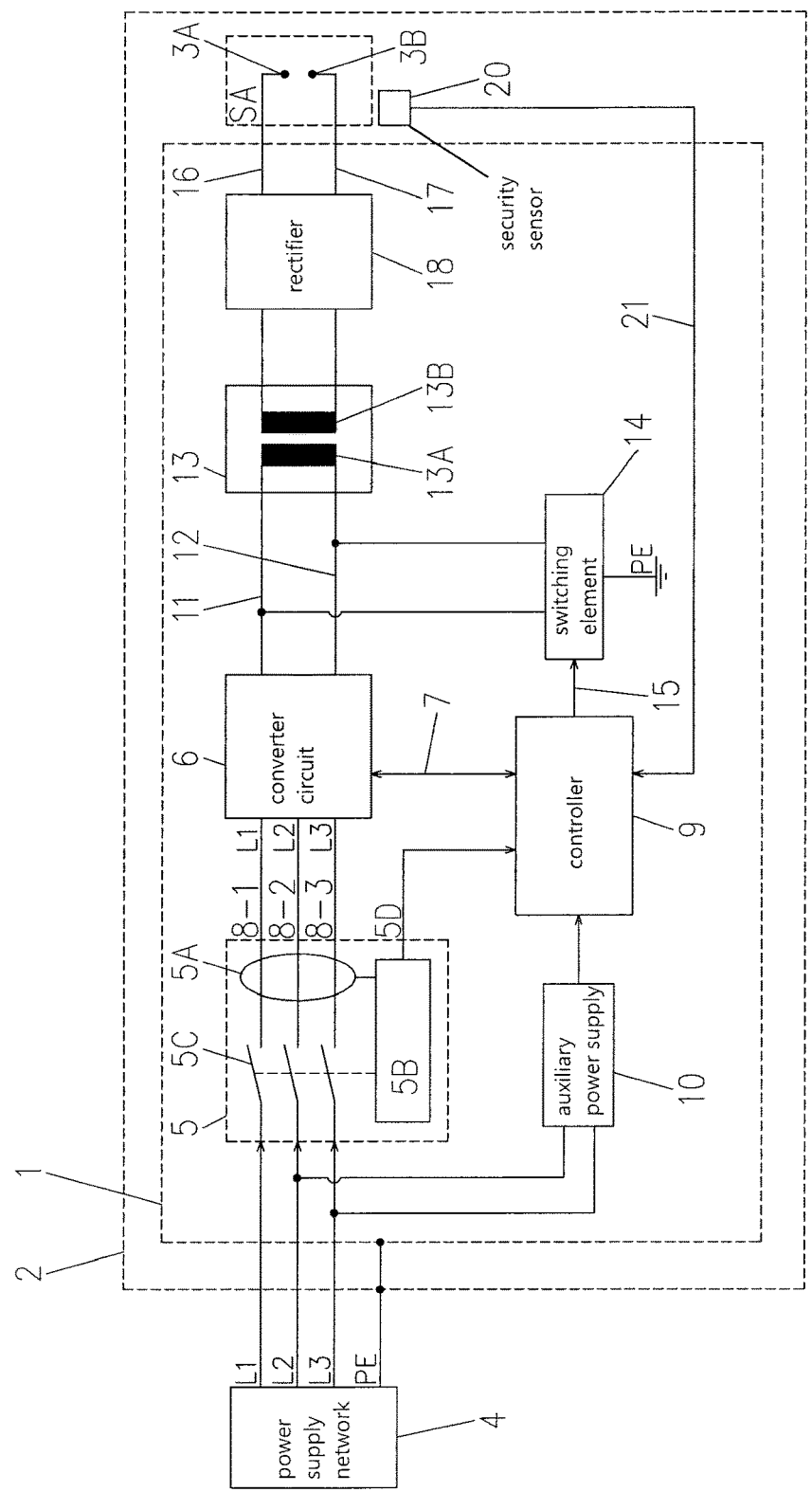
FIG. 4 shows a block diagram of a further possible exemplary embodiment of a power supply unit according to the present invention.

FIG. 4 shows a further possible exemplary embodiment of a power supply unit 1 according to the present invention. In the illustrated embodiment, the electrodes 3A, 3B of the resistance welding equipment 3 are provided within a security area SA of a resistance welding cell of the resistance welding apparatus 2. In the illustrated embodiment, at least one security sensor 20 is connected via a signal line 21 to the controller 9 of the power supply unit 1. The security sensor 20 is adapted to monitor whether a person has entered the security area SA of the resistance welding cell. The security sensor 20 notifies the controller 9 when a person enters the security area SA, for instance via a gate or barrier. If the security sensor 20 notifies the controller 9 that a person has entered the security area SA of the resistance welding cell the controller 9 switches automatically the switching element 14 on such that the primary coil 13A of the transformer 13 is connected directly or via capacitor elements 19A, 19B to protective earth potential PE. In this way, the security of a person operating the resistance welding apparatus 2 is further increased.

Figure 5:
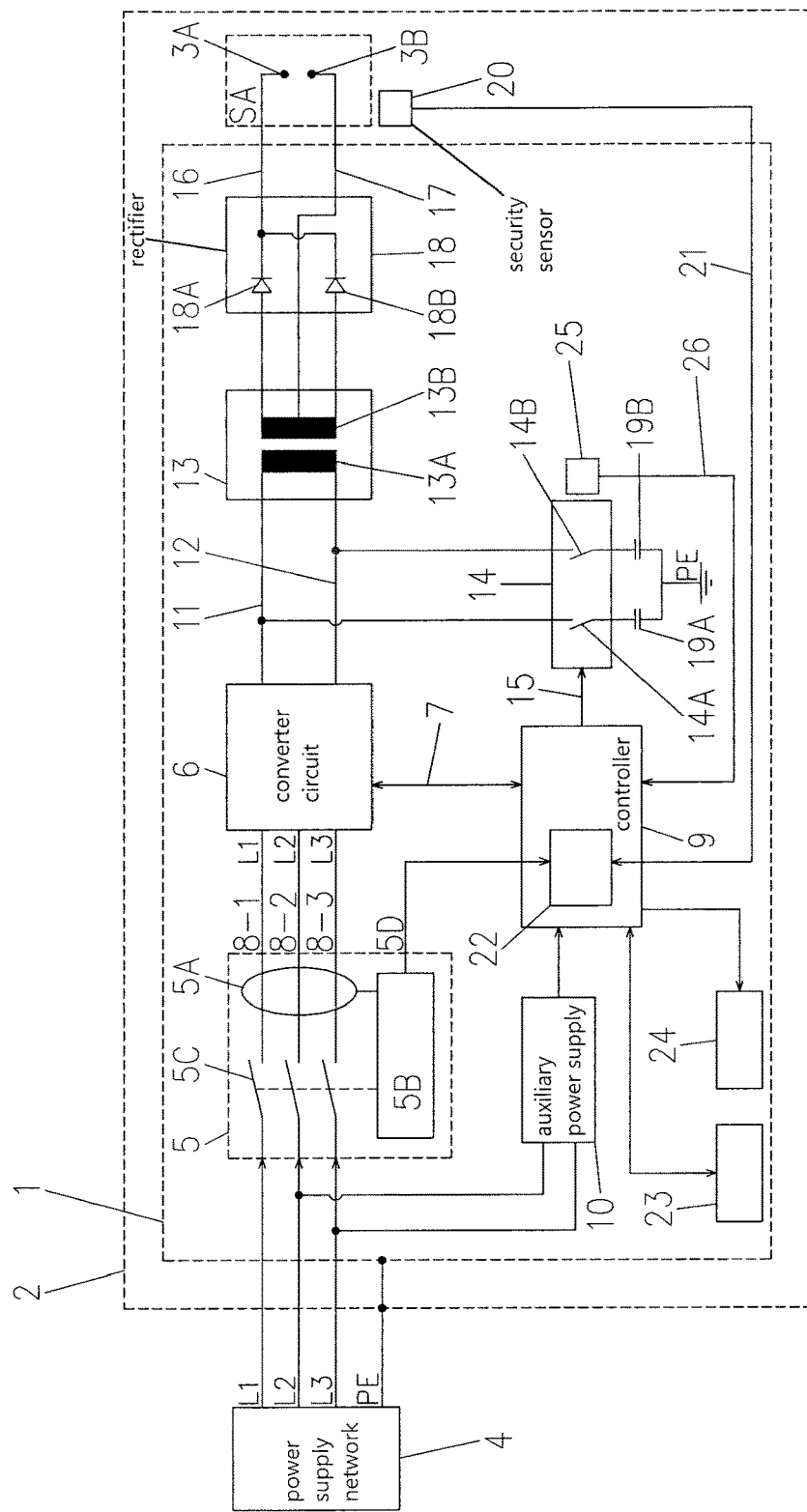
FIG. 5 shows a block diagram of a further possible exemplary embodiment of a power supply unit according to the present invention.

FIG. 5 shows a block diagram of a further possible exemplary embodiment of a power supply unit 1 according to the present invention. In the illustrated embodiment, the controller 9 comprises an integrated monitoring logic 22 connected to the residual current protection circuit 5 via a control line 5D. The monitoring logic 22 monitors the residual current and/or the state of residual current protection circuit 5 and can be adapted to switch the switching element 14 such that the primary coil 13A of the transformer 13 and the output of the converter circuit 6 are switched to the protective earth potential PE if the measured residual current exceeds a predetermined configurable threshold value. In the illustrated embodiment of FIG. 5, the controller 9 is connected to a user interface 23 and to a data interface 24 of the power supply unit 1. In the illustrated embodiment of FIG. 5, the power supply unit 1 further comprises a switching state sensor 25 monitoring the switching state of the switching element 14. If the monitored switching state of the switching element 14 does not comply with a switching command previously applied to the switching element 14 by the controller 9 a warning signal can be generated which can be output to a user via the user interface 23 of the power supply unit 1. Further, if the monitored switching state of the switching element 14 does not comply with a switching command previously applied to the switching element 14 by the controller 9 the resistance welding process can be automatically interrupted by the controller 9. In the illustrated exemplary implementation of FIG. 5, the switching state monitoring sensor 25 notifies the controller 9 about the switching state of the switching element 14 via a signal line 26. In the illustrated embodiment of FIG. 5, the different sensors, i.e. the security sensor 20 and the switching state monitoring sensor 25 are connected separately via corresponding sensor signal lines to the controller 9. In an alternative embodiment, the different sensors can also be connected to the controller 9 via a signal bus.

In the illustrated embodiment of FIG. 5, the current rectifier circuit 19 comprises two diode elements 18A, 18B to rectify the supply current for the resistance welding equipment 3 of the resistance welding apparatus 2.

The security sensors 20 provided at the security area SA can be mounted at cage doors of the welding cell. The cage can be installed to prevent a movement of a person within the welding cell when an entry door is open. The opening of the entry door of the cage can be notified by the security sensor 20 via the signal line 21 or a signal bus to the controller 9 of the power supply unit 1. The opening of a cage door can also be notified to an operator via the user interface 23 of the power supply unit 1. The resistance welding apparatus 2 as shown in FIG. 5 can be used for spot and/or seam welding.

The transformer 13 can supply energy to the weld joint in form of a low voltage, high current AC power rectified by the rectifier circuit 18. The joint of the workpieces has a high electrical resistance relative to the rest of the circuit and is heated up to its melting point by the supplied electrical current. The semi-molten surfaces of the workpieces are pressed together by the welding pressure that creates a fusion bond resulting in a uniform welding structure. The resistance welding equipment 3 can also comprise a water-cooling system to cool the electrodes and/or the joined workpieces. The electric current provided by the power supply unit 1 to the workpieces during the welding process can vary depending on the application and can be in a range between 100 and 100,000 A.

In a possible embodiment, the converter circuit 6 can comprise a bridge circuit including insulated gate bipolar transistors IGBT. The IGBTs can be connected within a bridge circuit of the converter circuit 6. The switching of the IGBTs of the converter circuit 6 can also be controlled by the controller 9 of the power supply unit 1. As an alternative to the IGBTs also MOSFETs can be used as switching elements within the converter circuit 6. The inverter bridge of the converter circuit 6 can use a pulse width modulation scheme to regulate an output voltage and current. The inverter bridge output can be supplied to the high frequency transformer 13 of the power supply unit 1. The converter circuit 6 can comprise a full bridge inverter having two switching pairs which turn on and off alternately to generate an output signal applied to the primary coil 13A of the transformer 13.

A closed-loop feedback can be used to control the weld energy in submillisecond increments of the pulse width modulation signal. In a possible implementation, a three-phase input current can be rectified and switched at a frequency of up to 25 kHz to provide an AC current at the primary coil 13A of the welding transformer 13. The secondary current output by the secondary coil 13B of the transformer 13 is then rectified by the rectifier circuit 18 to provide the DC welding current which can comprise a low level AC ripple. A high-speed feedback circuitry integrated in the controller 9 can enable the inverter power supply provided by the converter circuit 6 to adapt to changes in a secondary loop resistance and to changes in the dynamics of the welding process. For example, an inverter power supply of more than 10 kHz can ad-just the output current every few microseconds after rectification. This allows the welding time, i.e. the duration of the welding current to be controlled accurately. Accordingly, in this embodiment, the controller 9 has an integrated high-frequency closed-loop feedback which can be used to control either the current, the voltage or the power while monitoring another of the same three welding parameters. The high-frequency closed-loop feedback circuitry of the controller 9 can be connected to a current sensor provided between the rectifier circuit 18 and an electrode of the resistance welding equipment 3 and to a voltage sensor element sensing the volt-age drop across the welding electrodes 3A, 3B of the resistance welding equipment 3. By monitoring in real time continuously the actual electrical current I flowing through the workpieces during the welding process and by monitoring continuously the voltage drop the controller 9 can provide a high-frequency closed-loop feedback and maintain welding parameters constant even under changing environmental conditions. Further, the monitored current and the monitored volt-age at the workpieces welded by the welding electrodes 3A, 3B can also be used to detect a faulty operational condition to trigger the switching element 14. If the observed current and/or voltage indicates a faulty operation condition of the welding process the controller 9 can operate in a possible embodiment the switching element 14, so that the residual current protection circuit 5 triggers its circuit breaker 5C and the welding process gets automatically interrupted.

The power supply network 4 can provide an alternating power supply current with a different frequency of e.g. 50 Hz or 60 Hz. The switching element 14 can comprise in a possible embodiment electromechanical switches such as relays or contactors. In an alternative embodiment, the switching element 14 can comprise semiconductor switching elements controlled by the controller 9. In a still further alternative embodiment, the switching elements 14 can comprise hybrid switching elements comprising an electromechanical switching contact and a semiconductor switching element being connected in parallel to each other.

In a further possible embodiment, the controller 9 has access to a configuration memory adapted to store operation parameters of the power supply unit 1. These operation parameters comprise in a possible implementation a threshold value for the residual current triggering the residual current protection circuit 5. Further, the configuration parameters stored in the memory can indicate the frequency of the power supply network 4 to allow operation of the converter circuit 6. The power supply unit 1 used for operating the resistance welding equipment 3 can be integrated in a moveable housing and connected to the resistance welding equipment 3 via an electrical and mechanical interface. In an alternative embodiment, the power supply unit 1 is integrated in the resistance welding apparatus 2. In a further possible implementation, the capacitance of the capacitors 19A, 19B is adjustable by the controller 9 according to the stored configuration parameters.

In a still further possible embodiment, the controller 9 comprising the monitoring logic 22 can register the measured operation parameters during the welding process and register the data in a dataset temporarily in a memory of the power supply unit 1. In a possible embodiment, the registered datasets can be output via the data interface 24 for further processing and evaluation, in particular if the welding result is not satisfactory. The observed operation parameters can comprise the electrical current I flowing through the workpieces, the voltage U applied to the workpieces by the electrodes 3A, 3B and the applied mechanical force F during the welding process. The measured operation parameters can include the weld current, a voltage drop across the electrodes, workpiece expansion and workpiece deformation, an electrode force, an electrode movement, a temperature of the workpieces and acoustic sounds emitted during the welding process. The observed welding parameters can be used to optimize the resistance welding process. The observed data can be output via the data interface 24 to an external evaluation unit adapted to evaluate the observed operation parameters during the welding process and/or to optimize the configuration parameters of the controller 9.

In the illustrated embodiments of FIGS. 1 to 5, the power supply network 4 provides three alternating current phase signals L1, L2, L3 which are converted by the converter circuit. In an alternative embodiment, the number of current phases may vary, for instance one or two power supply current phases.

In a further possible embodiment, the resistance welding apparatus 2 comprises a continuity monitoring system adapted to measure an electrical continuity between the electrodes 3A, 3B to verify whether they are actually touching the workpieces to be welded. If, for instance, the operator's fingers block the movement of the electrodes 3A, 3B the continuity monitoring system of the resistance welding apparatus 2 detects that there is no continuity and can supply a warning signal to the controller 9 of the power supply unit 1 which in turn switches the output of the converter circuit 6 to protective earth PE.

In a possible embodiment, the controller 9 comprises a micro-processor adapted to execute a resistance welding control program. The invention provides according to a further aspect a computer-implemented method for performing resistance welding. In the method, an alternating power supply current applied via a residual current protection circuit 5 is converted into a pulsed current transformed by a transformer 13 into an electrical current supplied to a resistance welding equipment 3. During welding intermissions, a primary coil 13A of the transformer 13 is automatically switched by a switching element 14 to protective earth potential PE. According to the computer-implemented method, if a security area SA around the resistance welding equipment 3 is entered by a person the primary coil 13A of the transformer 13 is automatically switched by the switching element 14 to protective earth potential PE. Further, if a measured residual current of the alternating power supply current exceeds a predetermined threshold value the primary coil 13A of the transformer 13 is automatically switched by the switching element 14 to protective earth potential PE and the alternating power supply current is interrupted automatically by the residual current protection circuit. In a possible embodiment of the computer-implemented method, a switching state of the switching element 14 is continuously monitored wherein if the monitored switching state of the switching element 14 does not comply with a switching command previously applied to said switching element 14 a warning signal is automatically generated and/or the resistance welding process is automatically interrupted.

In the illustrated embodiments of FIGS. 1 to 5, the transformer 13 and the rectifier circuit 18 form part of the power supply unit 1. In an alternative embodiment, the transformer 13 and the rectifier circuit 18 can also form part of the resistance welding equipment 3 and being connected to the converter circuit 6 of the power supply unit 1 via a cable having two wires 11, 12 and having a length of several meters. In a further possible embodiment of the resistance welding apparatus 2, the resistance welding equipment 3 is replaceable. In a possible implementation, a replacing of the resistance welding equipment 3 can be observed by a sensor and notified to the controller 9 of the power supply unit 1. During replacement of the resistance welding equipment 3, the controller 9 automatically closes the switching element 14 so that the output of the converter circuit 6 is connected to protective earth PE.

The power supply unit 1 of the resistance welding apparatus 2 provides maximum security to the operator during the resistance welding process. Further, it allows to use a switching element 14 of a small size and allows for a very high frequency of the pulsed electrical current applied to the resistance welding equipment 3 without significant power losses.

The invention claimed is:

1. A power supply unit for a resistance welding apparatus, said power supply unit comprising:
   a converter circuit adapted to convert an alternating current, AC, of a power supply with protective earth applied via a residual current protection circuit to an input of said converter circuit into a pulsed electrical current supplied from an output of said converter circuit to a primary coil of a transformer of said resistance welding apparatus, and
   at least one switching element provided between the output of said converter circuit and protective earth.

2. The power supply unit according to claim 1 wherein the power supply unit comprises a controller adapted to control said switching element or wherein said power supply unit comprises an interface for connecting an external controller of said resistance welding apparatus with said power supply unit.

3. The power supply unit according to claim 2 wherein during welding intermissions of a resistance welding process performed by said resistance welding apparatus the controller is adapted to switch automatically the at least one switching element on such that the output of the converter circuit of said power supply unit and both connection terminals of the primary coil of the transformer are switched to protective earth potential.

4. The power supply unit according to claim 1 wherein a capacitor is connected in series with said switching element.

5. The power supply unit according to claim 4 wherein a resistor is connected in series and/or in parallel with said capacitor.

6. The power supply unit according to claim 1 wherein said at least one switching element comprises an electromechanical switching element and/or an integrated semiconductor switching element.

7. The power supply unit according to claim 6 wherein the electromechanical switching element of said power supply unit comprises a contactor or a relay controlled by a controller of said resistance welding apparatus.

8. The power supply unit according to claim 1 wherein said at least one switching element comprises a switching state monitoring sensor connected to a controller and adapted to monitor a switching state of said switching element.

9. The power supply unit according to claim 1 wherein the pulsed current applied from the output of said converter circuit to the primary coil of the transformer of said resistance welding apparatus during the welding process performed by the resistance welding apparatus comprises a frequency of more than 500 Hz.

10. The power supply unit according to claim 1 wherein the transformer of said resistance welding apparatus comprises the primary coil connected to the output of the converter circuit of said power supply unit and a secondary coil connected to a current rectifier circuit adapted to rectify the transformed pulsed current output by the secondary coil of said transformer.

11. The power supply unit according to claim 10 wherein a resistance welding equipment is connected to said current rectifier circuit to receive the rectified current output by the secondary coil of said transformer.

12. The power supply unit according to claim 11 wherein the resistance welding equipment of said resistance welding apparatus is operated in a security area of a resistance welding cell of said resistance welding apparatus, wherein at least one security sensor is connected to a controller adapted to monitor whether a person has entered the security area of the resistance welding cell.

13. The power supply unit according to claim 12 wherein if the at least one security sensor of said resistance welding apparatus notifies the controller that a person has entered the security area of said resistance welding cell the controller switches automatically the switching element on such that the primary coil of the transformer is connected directly or via a capacitor to protective earth potential.

14. The power supply unit according to claim 1 wherein the residual current protection circuit of the power supply unit comprises a sensor coil adapted to measure a residual current flowing through wires connecting a single or multiphase power supply network with the input of said converter circuit and a monitoring logic adapted to trigger a circuit breaker provided between the power supply network and the converter circuit if the residual current measured by said sensor coil exceeds a predetermined threshold value.

15. The power supply unit according to claim 14 wherein the monitoring logic of said residual current protection circuit is connected to a controller and/or is integrated in the controller and/or is connected directly to the switching element and is adapted to switch the switching element such that the primary coil of the transformer is connected to the protective earth potential if the measured residual current exceeds the predetermined threshold value.

16. A resistance welding apparatus comprising
    a power supply unit having
       a converter circuit adapted to convert an alternating current, AC, of a power supply with protective earth applied via a residual current protection circuit to an input of said converter circuit into a pulsed current supplied from an output of said converter circuit to a primary coil of a transformer of said resistance welding apparatus and having at least one switching element provided between the output of said converter circuit and protective earth,
    said resistance welding apparatus further comprising a resistance welding equipment connected to a secondary coil of said transformer.

17. The resistance welding apparatus according to claim 16 wherein the resistance welding equipment is operated in a security area of a resistance welding cell having at least one security sensor connected to a controller of said resistance welding apparatus and adapted to monitor whether a person has entered the security area of said resistance welding cell.

18. The resistance welding apparatus according to claim 17 wherein the controller of the resistance welding apparatus is adapted to switch automatically the switching element on such that the output of said converter circuit and the primary coil of the transformer of the resistance welding apparatus is connected to protective earth potential if the security sensor of the resistance welding cell notifies the controller that a person has entered the security area of the resistance welding cell.

19. The resistance welding apparatus according to claim 16 wherein the resistance welding equipment of the resistance welding apparatus comprises a welding gun with electrodes connected via wires extending through a moveable welding robot arm to the secondary coil of the transformer of said resistance welding apparatus.

20. A method for performing resistance welding,
wherein an alternating current, AC, of a power supply with protective earth applied via a residual current protection circuit is converted into a pulsed current transformed by a transformer into an electrical current supplied to a resistance welding equipment,
wherein during welding intermissions a primary coil of said transformer is automatically switched by a switching element to protective earth potential.

21. The method according to claim 20 wherein if a security area around the resistance welding equipment is entered by a person the primary coil of said transformer is automatically switched by the switching element to protective earth potential.

22. The method according to claim 20 wherein if a measured residual current of the alternating power supply current, AC, exceeds a predetermined threshold value the primary coil of said transformer is automatically switched by the switching element to protective earth potential and the alternating power supply current, AC, is interrupted by the residual current protection circuit.

23. The method according to claim 20 wherein a switching state of said switching element is continuously monitored, wherein if the monitored switching state of the switching element does not comply with a switching command previously applied to said switching element a warning signal is generated and/or the resistance welding is automatically interrupted.

24. The method according to claim 20 wherein the primary coil of said transformer is switched by said switching element via a capacitor to protective earth potential.

* * * * *